Patented Jan. 3, 1950

2,493,584

UNITED STATES PATENT OFFICE 2,493,584

HYDROGENATED POLYMER OF 2-VINYLDI-BENZOFURAN

Edward A. Kern, Pittsfield, Mass., assignor to General Electric Company, a corporation of New York No Drawing. Application September 27, 1945, Serial No. 618,985

2 Claims. (Cl. 260—88.5)

This invention relates broadly to hydrogenated polymers and more particularly to products or compositions comprising a hydrogenated, thermoplastic polymer of a vinyldibenzofuran. The invention especially is concerned with the production of thermoplastic compositions comprising a hydrogenated polymer of a monovinyldibenzofuran, e. g., 2-vinyldibenzofuran, 4-vinyldibenzofuran, etc.

Monomeric vinyldibenzofurans and methods of preparing the same are disclosed and claimed in the copending application of Royal K. Abbott, Jr., Serial No. 567,784, filed December 11, 1944. Polymeric vinyldibenzofurans and methods of preparation are disclosed and claimed in the copending application of Edward A. Kern, Royal K. Abbott, Jr., and Mary Vial Brandow, Serial No. 567,786, also filed December 11, 1944. Both of these copending applications are assigned to the same assignee as the present invention. In practicing my invention I use as a starting material a polymeric, thermoplastic vinyldibenzofuran, more particularly a polymeric monovinyldibenzofuran, of the kind described and claimed in the aforementioned Kern et al. copending application. The polymeric monovinyldibenzofurans are thermoplastic materials, that is, they soften under heat.

Briefly, vinyldibenzofurans are prepared, as set forth in the above mentioned application Serial No. 567,784, by acetylating dibenzofuran with an acetylating agent, e. g., acetic acid or anhydride, acetyl chloride or bromide, ketene, etc. The products of acetylation are then hydrogenated to form dibenzofurylmethyl carbinols which are in turn dehydrated to obtain vinyldibenzofurans.

Dibenzofuran (also known as diphenylene oxide) readily undergoes the Friedel-Crafts reaction with either acetyl chloride or acetic anhydride in the presence of aluminum chloride. The chief product is 2-acetyldibenzofuran. The dibenzofuran is dissolved in carbon disulfide and reacted with either acetyl chloride or acetic anhydride, preferably the latter. Small amounts of 2,8-diacetyldibenzofuran are obtained as well as some triacetyldibenzofuran, and possibly even more highly substituted products. All of these by-products may be reduced and converted to compounds which polymerize to yield polymers which differ markedly from those obtained when the monovinyl compound is polymerized. Vinyl compounds such as these also undergo cross-linkage upon polymerization with the formation of copolymers having useful physical properties.

The 2-acetyldibenzofuran is reduced catalytically by high pressure hydrogenation in the presence of a catalyst, converting the monoketone to 2-dibenzofurylmethyl carbinol. This secondary carbinol is separated from small amounts of by-products by distillation at 180° C. at 1 mm. pressure. At higher pressures the carbinol boils with some decomposition, water being split out. This dehydration increases as the distillation pressure increases, and consequently the temperature is raised. The carbinol boils with slight decomposition at 194° C. at 7 mm. and 205° C. at 12 mm. pressure. It is not necessary to dry or redistill the carbinol since it is obtained in a state of high purity by the single distillation.

The next step in the process is the conversion of the 2-dibenzofurylmethyl carbinol into 2-vinyldibenzofuran. This may be done either by direct vapor phase catalytic dehydration or by reaction of the secondary carbinol with thionyl chloride ($SOCl_2$) and treatment with alcoholic caustic or pyridine.

The direct vapor phase catalytic dehydration is the preferred method and consists in passing the vapors of the carbinol over activated alumina in a system which is maintained at a pressure of less than 1 mm. of mercury. The product thus obtained is dried and filtered and may be used without further purification. The dehydration process is quantitative and the monomer shows substantially complete negative tests for ketone, carbinol and water.

The polymerization of vinyl-substituted dibenzofurans, e. g., 2-vinyldibenzofuran, may be accomplished by polymerizing the monomer itself, a solution thereof or in the form of an emulsion or suspension. The readiness and speed of the polymerization depend greatly upon the purity of the monomer. The purer the monomer, the greater is the ease and rate of polymerization and the higher the molecular weight of the polymer. The physical properties of the polymers produced are, to a large extent, dependent upon the method of polymerization. Polymerizations carried out at high temperatures or at a very rapid rate usually produce a product that is discolored and of low molecular weight. In order to produce valuable polymerization products, careful control of the polymerization is necessary.

The polymerization may be accelerated by the use of catalysts, examples of which are $BF_3$, $SnCl_4$, $SbCl_5$, organic or inorganic peroxide, air, the halogens, oxygen, ozone, the halogen acids, light of short wave length, and substances such as activated carbon or copper which possess large surface areas. Small amounts of solvents have little effect upon the rate of polymerization. Larger amounts tend to favor the formation of short chain lengths and often produce a period of incubation causing an interval to elapse between the addition of the catalyst and the beginning of polymerization. The monomer may in general be inhibited by the same inhibiting agents that retard the polymerization of styrene.

The present invention is based on my discovery that, by hydrogenating a thermoplastic polymer of a vinyldibenzofuran, more definitely polymeric monovinyldibenzofuran (e. g., poly-2-vinyldibenzofuran, poly-4-vinyldibenzofuran, etc.) and mixtures thereof (e. g., mixtures of poly-2-vinyldibenzofuran and poly-4-vinyldibenzofuran, etc.), hydrogenated polymers are obtained that are substantially more resistant to heat, as evidenced by their higher softening and heat-distortion points, than the corresponding non-hydrogenated, thermoplastic, polymeric vinyldibenzofuran. Furthermore, the hydrogenated polymer is tougher and less brittle than the non-hydrogenated material. The power factor and insulation resistance of the polymer are not adversely affected by the hydrogenation treatment, being about the same as before hydrogenation. The dielectric constant of the hydrogenated polymer usually is slightly higher than that of the non-hydrogenated polymer. In view of these electrical properties, the hydrogenated polymers are suitable for use in the same electrically insulating applications, e. g., in the electronics field, as the non-hydrogenated polymers, that is, where low power factor and low leakage losses are important electrical properties, with the added advantage that the hydrogenated polymers are tougher and more resistant to heat. As a result the hydrogenated polymers are capable of withstanding greater physical stresses, and more severe heat conditions in service use, than the non-hydrogenated polymers, and also may be employed in electrically insulating and other fields for which the latter would be unsuited.

In practicing my invention I prefer to hydrogenate a thermoplastic polymer of a vinyldibenzofuran, more particularly polymeric monovinyldizenzofuran, e. g., poly-2-vinyldibenzofuran, poly-4-vinyldibenzofuran, etc., until its softening point or its heat-distortion point has increased at least about 10° C., for example about 15° to 25° C. or more, specifically about 20° C. The products are useful when only limited hydrogenation has been effected, for instance hydrogenation sufficient to increase the softening point, say, from 2° to 5° C., but from a practical standpoint it is desirable to continue hydrogenation until the softening point has increased from about 10° to 30° C. or more. Thus the thermoplastic polymer, e. g., polymeric 2-vinyldibenzofuran, may be hydrogenated until it has combined with hydrogen in an amount corresponding to, for example, about 1 to 6 per cent by weight thereof, more particularly about 2 to 4 per cent by weight of the polymer undergoing treatment. The polymer may be only partially hydrogenated or it may be substantially completely hydrogenated.

Any suitable means of hydrogenating the polymer may be employed. For example, the polymer may be hydrogenated in solution or dispersed state, e. g., in a solution of dioxane, at superatmospheric pressure, e. g., at pressures ranging from about 500 to 5000 pounds or more per square inch, and at normal or at elevated temperatures, e. g., at temperatures ranging from about 25° or 30° C. to 400° C., in the presence of a hydrogenation catalyst, e. g., activated Raney nickel.

In order that those skilled in the art better may understand how the present invention may be carried into effect, the following example is given by way of illustration and not by way of limitation.

Example

Two hundred (200) grams of poly-2-vinyldibenzofuran was dissolved in 1100 grams dioxane, which previously had been redistilled over sodium. Twelve (12) grams of activated Raney nickel was added, and the mixture placed in a bomb having a stainless steel liner. The pressure was brought up to 1800 pounds per square inch with hydrogen, and the temperature was increased while constantly shaking the bomb. The temperature was raised to 340° C. over a period of about 6 hours. The bomb was allowed to cool to room temperature at which point the pressure had dropped to 1500 pounds per square inch. The amount of hydrogen consumed in the hydrogenation reaction corresponded to 2.3 moles $H_2$ (or 4.6 atoms H) per 1.03 moles of the polymer calculated as monomeric 2-vinyldibenzofuran, or to 2.3 per cent by weight of hydrogen (H) calculated on the basis of the polymer. Two per cent by weight of hydrogen, based on the polymer, was probably used in saturating one ring of the dibenzofuran nucleus and the remainder in saturating any double bonds that were present in the polymer.

The solution of the hydrogenated poly-2-vinyldibenzofuran was filtered through diatomaceous earth (Celite), and the polymer precipitated from the filtered solution by pouring the latter into methyl alcohol. The filtered, dried polymer was opaque-white in appearance.

The hydrogenated polymer was compression molded, yielding a pure white, opaque disk instead of the clear, transparent disk obtained upon similarly molding non-hydrogenated poly-2-vinyldibenzofuran. The heat-distortion point (A. S. T. M. standard method of test) of the hydrogenated polymer was 135° C., that is, about 20° C. higher than the non-hydrogenated polymer. The molded, thermoplastic resin was tough and much less brittle than poly-2-vinyldibenzofuran. It had excellent electrical characteristics. Its insulation resistance was $74.4 \times 10^{12}$. Its power factor, which is about the same as poly-2-vinyldibenzofuran, was 0.07% at 1 megacycle and 25° C. and 0.15% at 60 cycles and 25° C. Its dielectric constant was 2.9 as compared with about 2.7 to 2.8 for the non-hydrogenated polymer.

The hydrogenated polymers of this invention may be combined with paper, glass cloth and other conventional electrical insulation materials to form composite electrical insulation, or they may be used alone in film or other form as insulation for electrical apparatus, or for other purposes. They may be dissolved in various solvents, e. g., dioxane, benzene, toluene, xylene, chlorobenzene, ethylene dichloride, dichloroethylene, trichlorethylene, tetrachloroethane, etc., and applied to paper, glass cloth, nylon, silk, rayon, cellophane, ethyl cellulose or other backing material to form sheets that are useful as dielectrics in capacitors, or as insulation for wires, cables and other electrical conductors.

The hydrogenated polymers may be ground and mixed with various fillers, e. g., asbestos, powdered quartz, talc, mica dust, titanium oxide, zinc oxide, magnesium oxide, wood flour, alpha-cellulose, etc., to produce a molding compound. Dyes, pigments, plasticizers, lubricants and other addition agents may be incorporated with the filled or unfilled hydrogenated polymer.

The hydrogenated polymers also may be extended in the plastic condition and then cooled, thereby imparting improved physical properties to films, threads, tubes, ribbons, rods, etc., formed from the resulting oriented polymer.

What I claim as new and desire to secure by Letters Patent of the United States is:

1. The method of increasing the heat-distortion point of a thermoplastic polymer of 2-vinyldibenzofuran which comprises dissolving said polymer in dioxane and hydrogenating said polymer in the presence of a hydrogenation catalyst at a pressure of about 1800 pounds per square inch at a temperature of about 340° C. until the polymer has combined with about 2.3 per cent by weight of hydrogen based on the weight of the said polymer.

2. A hydrogenated polymer of 2-vinyldibenzofuran, said polymer containing about 2.3 per cent by weight of combined hydrogen based on the weight of the corresponding non-hydrogenated polymer and having a heat-distortion point about 20° C. higher than the non-hydrogenated polymer.

EDWARD A. KERN.

REFERENCES CITED

The following references are of record in the file of this patent:

UNITED STATES PATENTS

| Number | Name | Date |
|---|---|---|
| 2,266,675 | Carmody | Dec. 16, 1941 |